United States Patent [19]

Fox, Jr.

[11] Patent Number: 4,478,859

[45] Date of Patent: Oct. 23, 1984

[54] METHOD OF MAKING STABLE EMULSIFIED MEAT PRODUCTS

[75] Inventor: Jay B. Fox, Jr., Ambler, Pa.

[73] Assignee: The United States of America as represented by the Secretary of Agriculture, Washington, D.C.

[21] Appl. No.: 382,903

[22] Filed: May 28, 1982

[51] Int. Cl.³ .............................................. A23B 4/00
[52] U.S. Cl. .................................. 426/266; 426/326; 426/332; 426/646; 426/652
[58] Field of Search ............... 426/105, 135, 266, 315, 426/326, 332, 335, 532, 574, 646, 652, 413, 265, 641

[56] References Cited

U.S. PATENT DOCUMENTS

| | | | |
|---|---|---|---|
| 2,874,060 | 2/1959 | Turner et al. | 426/646 X |
| 2,964,409 | 12/1960 | Sair | 426/646 |
| 2,992,115 | 7/1961 | Sair et al. | 426/646 X |
| 3,050,399 | 8/1962 | Kielsmeier et al. | 426/646 X |
| 3,050,400 | 8/1962 | Poarch et al. | 426/646 |
| 3,138,465 | 6/1964 | Naschek | 426/641 X |
| 3,147,122 | 9/1964 | Williams . | |
| 3,930,033 | 12/1975 | Corliss et al. | 426/103 |
| 4,141,999 | 2/1979 | Lolas | 426/104 |
| 4,143,171 | 3/1979 | Buckley et al. | 426/331 |
| 4,143,175 | 3/1979 | Whelan et al. | 426/582 |
| 4,166,138 | 8/1979 | Ziminski et al. | 426/249 |
| 4,279,935 | 7/1981 | Kentor | 426/646 X |
| 4,348,420 | 9/1982 | Lynch et al. | 426/646 X |

FOREIGN PATENT DOCUMENTS 104844  8/1980  Japan .................................. 426/646

OTHER PUBLICATIONS

Abstract: 41st Annual Meeting of Institute of Food Technologists, Jun. 7-10, 1981, Fox et al.

Primary Examiner—Arthur L. Corbin
Attorney, Agent, or Firm—M. Howard Silverstein; William E. Scott; David G. McConnell

[57] ABSTRACT

An emulsified meat product is made stable and resistant to acid deterioration by adding to the product up to 0.5% xanthan gum. The salt content of the emulsified product is reduced about five-fold by storing the product in an acidic pickle.

8 Claims, No Drawings

METHOD OF MAKING STABLE EMULSIFIED MEAT PRODUCTS

BACKGROUND OF THE INVENTION

1. Field of the Invention

This invention relates to emulsified meat products that are stable and resistant to deterioration when stored in an acid medium at elevated temperatures and to a method of making such products. More particularly the invention relates to the incorporation of xanthan gum into the gel structure of emulsified meat products thereby making such products stable and resistant to deterioration in acid medium and allowing them to be stored in vinegar pickle at elevated temperatures.

2. Description of the Art

Xanthan gum has been used to thicken doughs made of vegetable proteins, albumin and starches to make bacon analogs. It has also been combined with locust bean to form a gel structure in a mildly acid cheese food product. Xanthan gum has also been used as a binding agent in some meat products to bind meat fiber bundles together.

SUMMARY OF THE INVENTION

An object of this invention is to make an emulsified meat product that is stable and resistant to deterioration in acid medium.

Another object is to provide an emulsified meat product that is stable and capable of resisting deterioration when it is stored in an acid medium at elevated temperatures for extended periods of time.

A further object is to provide a pickled emulsified meat product.

A still further object is to provide a low-salt pickled emulsified meat product.

The above objects are accomplished by a method wherein up to 0.5% of xanthan gum is added to an emulsified meat product. The xanthan gum is added to a finely dispersed emulsion made from whole meat such as beef and pork into which spice, nitrite ascorbate, sugar and salt have been incorporated, the resultant emulsified product stuffed into casings, the encased product processed in a smokehouse, and the smokehouse treated product stored in an acid medium such as vinegar pickle. A low salt emulsified meat product is prepared by storing the smokehouse treated product in salt-free acid medium such as a salt-free vinegar pickle. Although the xanthan gum can be added in different ways and at different times, it is best accomplished while the emulsified meat product is being prepared. One very satisfactory way of adding the xanthan gum to the emulsified meat product is to add the gum to a premix of spice, nitrite, ascorbate, sugar, salt, and water and add the premix to the dispersed emulsion.

DESCRIPTION OF THE INVENTION

Shelf stable meat products do not require refrigeration and therefore conserve energy. Such products may be produced either by lowering the water activity through drying and/or by salt addition, or by lowering the pH through fermentation or pickling. The products preserved by pickling and vinegar do not require removal of the water and thus ma10° C. they are stable when the pH range is 3 to 4, but when stored at ambient room temperatures or elevated temperatures up to 37° C., the resilient texture deteriorates and the product becomes mushy. In order for these products to be shelf stable in an acid medium at elevated temperatures the emulsion texture has to be stabilized.

I found that the addition of up to 0.5% xanthan gum to an emulsified meat product stabilizes the texture of the cooked gel against deterioration brought about by storage in an acid medium such as vinegar pickle. My discovery makes it possible to develop new types of shelf stable pickled meat products which, without xanthan gum, turn soft and mushy because of deterioration of the emulsion texture. The invention is applicable to most emulsified meat products such as frankfurters, bologna, mettwurst, and bratwurst and prevents the texture of such products from deteriorating in acid medium, especially at elevated temperatures. The invention makes it possible to produce a pickled meat snack that is stable at ambient room temperatures, in fact, stable at temperatures up to 37° C. Products made by the process of this invention may be stored for considerable lengths of time without refrigeration thereby conserving energy.

The addition of up to 0.5% xanthan gum produces a gel structure in emulsified meat products which also includes the muscle protein that normally makes up the supportive network of the product. This gel structure is produced during the chopping procedure that produces the emulsion, and is set or coagulated during cooking to yield the firm, elastic texture of the finished frankfurter, bologna, or other product. The incorporation of the gum into this structure stabilizes the structure against any significant deterioration in acid medium. The optimal level is about 0.5% xanthan gum. Higher levels result in lower initial firmness and elasticity, and after long term storage, the product does not show any advantage over that made with the lower level. Otherwise all other parameters are essentially those of normal emulsified meat gel products. A novel feature of the invention is the incorporation of xanthan gum into the gel structure of emulsified meat products to make such products stable at elevated temperatures in acid medium, thereby allowing such products to be preserved at temperatures up to 37° C. in vinegar pickle.

Generally, an emulsified meat product is made of fat, protein, water, and salt, the last being added to extract and solubilize the muscle proteins. In the uncooked state, the material is an emulsion with the salt soluble proteins acting as the emulsifying agents. When cooked, the proteins are coagulated or set to form a rigid gel structure which still maintains the emulsion.

Although, as previously noted, the invention is useful with numerous different emulsified meat products it will, for the sake of clarity, be described in reference to its use in frankfurters. The frankfurters used to illustrate this invention were made from a formulation consisting of lean beef and pork and pork fat to yield a finished product containing 11% protein and 30% fat. The following additives were used: 1.2% spice mix; 125 p.p.m. $NaNO_2$; 425 p.p.m. sodium ascorbate; 1.6% sugar; and 2.0% NACl. Water, as ice, was added to 10% excess. The ingredients were chopped in a silent cutter at 2500 r.p.m. starting with the beef and lean pork. The spice, nitrite, ascorbate, sugar, and salt were premixed and added at 0.5 minutes after the cutter was started; two-thirds of the ice was added at 1.0 minute, the fat and the remainder of the ice at 3.5 minutes. The temperature of the emulsion at this point was 2.0° C. The emulsion was chopped until the temperature rose to 15.5°C. which required about 9 to 10 minutes. The emulsion was then stuffed into 23 mm diameter casings, linked, and processed with hickory smoke in a smokehouse to an internal temperature of 155°F. The above description is that of a generally standard industrial means of preparing a frankfurter or bologna type emulsion. In preparing the products of this invention the xanthan gum was added to the premix of spices, nitrite, etc., and incorporated into the emulsion with the premix. In order to demonstrate the efficacy of the invention, frankfurters made with the addition of xanthan gum were compared with frankfurters made with the addition of other compounds and gums such as sodium caseinate, the principle ingredient in non-fat dried milk and which is frequently used as a binder in meat emulsions; gluten, which produces a stable gel in flour doughs and has been shown to bind meat pieces; locust bean and guar gums, neutral seed gums that are little effected by heat processing acids, salts or proteins; gum arabic because it has emulsifying properties; carrageenan, an anionic gum which binds proteins; and chitosan, a cationic gum derived from crustacean shells. For purposes of comparison, the compounds or gums were added at the level of 0.5% on a weight per volume of emulsion basis. Frankfurters made with the addition of each of the above ingredients were placed in jars and c. and some were stored at 37° C.

The pH change in the frankfurters occurred quite swiftly. One day in the acid vinegar was sufficient to lower the pH of the outside surface from 6.2 to 4.8 while the core dropped to 5.4. After two to three days, the pH was about 4.3, both inside and outside. With the addition of vinegar to keep the frankfurters covered, there was a slow continual drop in the pH value over the subsequent three to four weeks of storage to about 3.9. There was no appreciable variation in the pH values of any of the frankfurters regardless of the ingredient which had been added, and the decrease in pH was about the same when the frankfurters were stored at 1° C. and at 37° C.

Emulsion stability of the frankfurters was evaluated before smokehouse processing by the phase test method described in J. Food Sci. 44, 174–176, 1979. No detectable or only slight deterioration in preprocessing emulsion quality was found in the frankfurters to which xanthan gum had been added. Frankfurters to which carrageenan had been added and those to which a combination of xanthan gum and locust bean gum had been added were found to be similar in quality to the frankfurters to which only xanthan gum had been added with regard to this particular property. The other gums and compounds resulted in lower phase ratings. Processing loss was not effected by the particular compound or gum which had been added to the frankfurters. The stability of the raw emulsion was determined by the Meyer test, Food Technol. 18, 138–140, 1964, by heating a centrifuged portion of the raw emulsion and measuring the volume of fat and water released during cooking. This test is a dry cooking loss test with a zero loss factor representing a highly retentive emulsion. Of all the added compounds and gums, xanthan gum was the only one that completely eliminated liquid loss. The stability of the cooked emulsion was determined by the cook test described in J. Food Sci. 46, 484–487, 1981, by submerging a frankfurter in boiling water for ten minutes and recording the weight loss or gain. Under these conditions the cooked emulsions can either lose or gain water. The frankfurters containing xanthan gum and those containing a combination of xanthan gum and locust bean gum increased in weight during cooking. All of the others lost moisture. This indicates that the addition of xanthan gum changes the character of the emulsion. Although the mixture of xanthan and locust bean gums forms a dimensionally stable gel, the combination did not demonstrate any better water holding capacity then xanthan alone. In other words, the combination had no apparent effect with respect to the water holding capacity. In fact, the water holding property of xanthan gum is unique in that while it increased water retaining ability in both cook tests, the processing losses were the same for the xanthan gum samples as for all the other samples that did not contain xanthan gum.

Upon cold storage at 3° C. in acid medium, the frankfurters made with the anionic gums, xanthan and carrageenan, showed increased resistance to penetration while all the other gels showed a decrease. The average P value (maximum force exerted during penetration) for the anionic gums was 33% higher than the average for the other gums. When the frankfurters were stored in acid medium at 37° C., the samples with the ionic gums, that is, the anionic xanthan and carrageenan and the cationic chitosan, showed an average decrease in the P value of 49% compared to 81% for the other gums. However, this resistance to penetration is not an indication of the stability of the emulsion because the chitosan frankfurters did not hold the emulsion, losing most of the fat and shrinking badly when cooked.

In order to determine the most desirable level at which to add the xanthan gum to the frankfurters test were conducted using 0.5%, 1.0%, and 1.5% additions of the gum. The overall results indicated that the addition of 0.5% xanthan gum is sufficient to achieve the desired properties. In fact, the samples of frankfurters to which the higher amount of gum was added were softer than those to which 0.5% had been added.

Experiments were conducted in which the xanthan gum was added at different stages during the preparation of the hot dogs to determine whether there was any advantage to adding the gum at any particular stage. It was found that the time of addition made no significant difference since the measured properties of the finished frankfurters were the same regardless of when the xanthan gum was added. Consequently, in preparing the frankfurters used in this invention, the dry gum was sprinkled over the emulsion between the addition of spice and the addition of fat.

After storage in acid medium, even for a relatively short period of time, some of the frankfurters to which a compound or gum other than xanthan or carrageenan gum had been added became mushy, that is, too soft or inelastic to be acceptable for consumption. However, at no time, even after six months storage, did any of the frankfurters made with emulsions in which xanthan or carrageenan gum had been incorporated become mushy.

In terms of its effectiveness in stabilizing an emulsified meat product such as frankfurter gel against deterioration in an acid medium such as vinegar pickle, xanthan gum had no equivalent among the other gums and compounds which were tested.

Although comminuted meat products have been pickled, the pickling of emulsified meat products is a concept that has not been heretofore discovered, and, as demonstrated by this invention, provides an excellent means of preserving frankfurters and other emulsified meat products for long periods of time at temperatures up to 37° C. I also discovered that it provides an unexpected and surprising means of lowering considerably the salt concentration in an emulsified meat product, thereby providing an excellent means of producing a low-salt frankfurter or other emulsified product. I found that the sodium in the frankfurter partitioned between the frankfurter gel and the pickle according to the Donnan equilibrium (Physical Biochemistry, H. Bull, John Wiley and Sons, 2nd Edition, 1951, pg. 268). In fact, as the ratio of pickle to frankfurter gel increased, the amount of sodium removed from the frankfurter also increased. At a 3:1 ratio of pickle to frankfurter gel, the sodium content of the frankfurter was reduced about five-fold in three days. In one day the sodium content of the frankfurter was reduced by about two-thirds. Although equilibrium was reached in six days, it was about 90% complete after three days.

For the purposes of this invention a low-salt frankfurter or other emulsified meat product is defined as one in which the salt content is lower than the salt content of the product prior to pickling or storing in salt-free acid medium.

I claim:

1. A method of making an emulsified meat product stable and resistant to acid deterioration comprising adding to said product in an amount up to 0.5% and then storing the product in an acid medium.

2. A method of making an emulsified meat product stable and capable of resisting deterioration when stored in an acid medium at temperatures as high as 37° C. for extended periods of time comprising adding, during the preparation of said meat product, in an amount up to 0.5%, to the ingredients of said product and then storing the product in an acid medium.

3. The method of claim 2 wherein the acid medium is vinegar pickle.

4. The method of claim 3 wherein the emulsified meat product is selected from the group consisting of frankfurter, bologna, mettwurst, and bratwurst.

5. In a process for making an emulsified meat product that is stable and capable of resisting deterioration when stored in an acid medium wherein beef and pork are first subjected to a cutting means to prepare a finely dispersed emulsion, then spice, nitrite, ascorbate, sugar, salt, water and fat are added to the emulsion and the emulsion further emulsified and stuffed into a casing and processed in a smokehouse, the steps comprising premixing the spice, nitrite, ascorbate, sugar and salt, adding xanthan gum to the premix, adding said premix to the finely dispersed emulsion to prepare the emulsified meat product and then storing the product in an acid medium.

6. The process of claim 5 wherein the amount of xanthan gum added to the premix does not exceed 0.5% of the weight of the emulsified meat product.

7. A method of preparing a pickled emulsified meat product, comprising
    (a) preparing a finely dispersed emulsion from whole meat;
    (b) preparing a premix of spice, nitrite, ascorbate, sugar, salt and xanthan gum;
    (c) incorporating said premix into the finely dispersed meat emulsion of step (a);
    (d) stuffing the product of step (c) into casings;
    (e) processing the encased product in a smokehouse; and
    (f) storing the product of step (e) in an acidic pickle.

8. A method of preparing a low-salt pickled emulsified meat product, comprising
    (a) preparing a finely dispersed emulsion from whole meat;
    (b) preparing a premix of spice, nitrite, ascorbate, sugar, salt and xanthan gum;
    (c) incorporating said premix into the finely dispersed meat emulsion of step (a);
    (d) stuffing the product of step (c) into casings;
    (e) processing the encased product in a smokehouse; and
    (f) storing the product of step (e) in a salt-free acidic pickle for at least one day.

* * * * *

UNITED STATES PATENT AND TRADEMARK OFFICE
CERTIFICATE OF CORRECTION

PATENT NO. : 4,478,859

DATED : October 23, 1984

INVENTOR(S) : Jay B. Fox, Jr.

It is certified that error appears in the above-identified patent and that said Letters Patent is hereby corrected as shown below:

Claim 1, line 3, the words -xanthan gum- should be inserted between "product" and "in" and line 3 should read "adding to said product xanthan gum in an amount up to 0.5% and".

Claim 2, line 5, the words -xanthan gum- should be inserted between "product," and "in" and line 5 should read "during the preparation of said meat product, xanthan gum in an".

Signed and Sealed this

Tenth Day of September 1985

[SEAL]

Attest:

DONALD J. QUIGG

*Attesting Officer*  Acting Commissioner of Patents and Trademarks - Designate